United States Patent [19]
Sonobe

[11] 4,128,780
[45] Dec. 5, 1978

[54] ROTOR HAVING IMPROVED ARM STRUCTURE TO REDUCE TENSILE STRESSES

[75] Inventor: Tadasi Sonobe, Iwaki, Japan

[73] Assignee: Hitachi, Ltd., Japan

[21] Appl. No.: 725,630

[22] Filed: Sep. 22, 1976

[30] Foreign Application Priority Data

Sep. 25, 1975 [JP] Japan .................................. 50-114667

[51] Int. Cl.² ............................................. H02K 1/22
[52] U.S. Cl. ...................................... 310/265; 310/269
[58] Field of Search ............... 310/216, 217, 261, 262, 310/264, 265, 269, 195

[56] References Cited
U.S. PATENT DOCUMENTS 3,046,426 7/1962 Gynt ................................. 310/265 X

FOREIGN PATENT DOCUMENTS 1183169 10/1964 Fed. Rep. of Germany ........... 310/265
177950 1/1962 Sweden ................................... 310/265

Primary Examiner—Mark O. Budd
Attorney, Agent, or Firm—Craig & Antonelli

[57] ABSTRACT

A rotor for use with rotary electric machinery, which includes a rotary shaft, a rotor core disposed around the rotary shaft and consisting of a plurality of silicon steel plates laminated to a predetermined thickness in the axial direction of the rotary shaft, a plurality of mounts secured to the rotor core by means of dove-tail joints as well as by welding and disposed on the inner circumferential surface of the rotor core plurality sets of arms, each set consisting of at least two arms whose one ends are connected to the mounts by welding, and whose other ends are connected to the rotary shaft by welding, said arms being inclined or curved to the radial direction in cross section perpendicular to the axial direction of the rotary shaft.

19 Claims, 9 Drawing Figures

ROTOR HAVING IMPROVED ARM STRUCTURE TO REDUCE TENSILE STRESSES

This invention relates to rotors for use with rotary electric machinery, and, more particularly, to rotors for use with rotary electric machinery adapted to be subject to hard impact loads, such as electric motors of rolling mills.

In general, a rotor for use with rotary electric machinery subjected to hard impact loads includes a rotary shaft, a rotor core arranged therearound, arms and bolsters, which rotor core is connected through the arms and bolsters to the rotary shaft. In the case of high capacity rotary electric machinery, the bolsters are secured to the rotor core by means of dovetail joints and the connections of the bolsters with the rotor core are reinforced by welding.

In operation of rotary electric machinery of the construction described above, a centrifugal force acts on the rotor core, and a temperature difference is produced between the rotor core and the rotary shaft. As a result, a tensile stress is generated in arms due to the centrifugal force and temperature difference, and then the tensile stresses act on the weld zones between the bolsters and the rotor core, thus giving rise to problems in strength which might lead to damage.

It is an object of the present invention to provide a rotor for use with rotary electric machinery, employed for hard impact loads, which rotor can reduce tensile stresses acting on weld zones, thus eliminating the need of having the weld zones subjected to annealing.

According to the present invention, there is provided a rotor for use with rotary electric machinery, which rotor comprises a rotor shaft having a plurality of sets of arms extending therefrom and a rotor core of laminated silicon steel plates of a predetermined thickness secured to the outer ends of a plurality of pairs of arms. Each set of arms has at least two arms, with each of said arms having a greater length in the section transverse to the axis of the rotary shaft than a minimum length in the radial direction of the rotary shaft. Also, at least a portion of each arm extends in a non-parallel direction with any radial direction of the rotary shaft.

Figure 1:
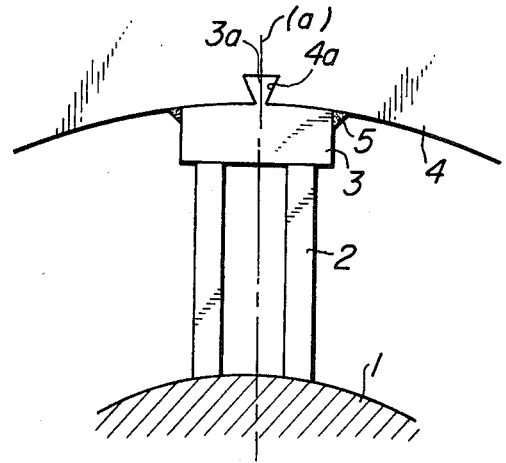
FIG. 1 is a partial cross-sectional view showing a prior art rotor for use with rotary electric machinery.

In FIG. 1, there is shown a prior art rotor for use with rotary electric machinery.

The prior art rotor as shown in FIG. 1 consists of a rotary shaft 1, a plurality of pairs of arms each extending substantially from the rotary shaft 1, bolsters 3 each secured to the outer ends of the two arms 2, and a rotor core 4 supported by the bolsters and consisting of a plurality of silicon steel plates laminated for a predetermined thickness in the axial direction of the rotor. The pair of arms 2 are connected at one ends to the rotary shaft 1, and at the other ends to the bolster 3 by welding although not shown. The bolster 3 is formed with a male portion 3a of a dovetail joint, while the rotor core 4 is formed with a female portion 4a of the dovetail joint. The male and female portions 3a and 4a are engaged with each others to define a dovetail joint for connecting the bolster (3) to the rotor core (4).

In operation, a centrifugal force is developed in the rotary electric machine. With the aforesaid arrangement, no residual internal stress remains in weld zones between the arms 2 and the rotary shaft 1 and between the arms 2 and the bolsters 3 since the weld zones have been annealed with the result that the assembly consisting of the arms, bolsters and rotary shaft becomes strong in strength. Therefore, even if a centrifugal force of large amount act on these weld zones, these weld zones can endure such centrifugal force and in fact, the centrifugal force acting on these weld zones is relatively small. In the case of a rotary electric machine of small or middle size, male and female portions 3a and 4a of the dovetail joint between the bolster 3 and the rotor core 4 can themselves endure a centrifugal force. In the case of a rotary electric machine of large size (for instance in the order of 4000 KW class), however, such dovetail joint cannot by itself endure a centrifugal force which amounts to a substantially large extent. Therefore, it is a common practice to apply welding as at 5 in addition to the dovetail joint between the bolsters 3 and the rotor core 4 so that the connection of the bolsters with the rotor core (4) can endure a centrifugal force developed in operation. However, in case the connection of the bolsters 3 with the rotor core 4 is reinforced by welding as at 5, other problems arise in connection with the weld zones (5).

As described hereinbefore, the weld zones between the arms 2 and the rotary shaft 1 and between the arms 2 and the bolsters 3 are strong in strength due to the application of annealing. However, the rotor core 4 consists of a plurality of thin silicon steel laminated in a predetermined amount of thickness, so that the rotor core 4 is loose and hence impossible to be subjected to annealing. Therefore, the weld zones 5 between the rotor core 4 and the bolsters 3 can not be subjected to annealing.

With the prior art rotor as shown in FIG. 1, two arms 2 are positioned between the rotary shaft 1 and the rotor core 4 in parallel relation to each other and extend in parallel relation to the radial direction (a) which extends through the axis of the rotary shaft 1 and the center line of the bolster 3. In this case, rigidity of the arms 2 in the radial direction is considerably high, so that high internal stresses incident thereto act on the weld zones 5 in the form of tensile stresses. In operation, there develops a temperature difference between the rotary shaft 1 and the rotor core 4 resulting in thermal expansion in the arms due to the temperature difference to produce further large tensile stresses in the arms. Still furthermore, the rotor core 4 experiences thermal expansion due to its relatively high temperature, thus developing tensile stresses which in turn act on the weld zones 5. The weld zones 5 which have not been subjected to annealing are not strong in strength, so that the tensile stresses applied on the weld zones poses a significant problem in strength.

The experiments conducted by the inventor shows that in the case of a rotary electric machine having a capacity of 4000 KW, which has the rotor core 4 of an inner diameter of 2500 φ and the rotary shaft of an outer diameter of 1500 φ, a temperature of the rotor core 4 is 60° C., a temperature of the rotary shaft 1 is 30° C., with a resulting temperature difference being 30° C. In this case, tensile stresses produced in the weld zones 5 is found to be 8.7 kg/mm². In the case of a rotary electric machine of a 4000 KW class, fatigue strength of the weld zones 5 is found to be 10 kg/mm². A tensile stress as high as 8.7 kg/mm² acting on a weld zone is extremely high, as compared with the aforesaid fatigue strength, so that repeated application of tensile stresses would result in failure of the weld zones 5, posing a vital strength problem for the rotor.

FIGS. 2, 6 to 9 show several embodiments of the rotor for use with rotary electric machinery according to the present invention, in which like parts are designated by like reference numerals in common with those of the prior art rotor as shown in FIG. 1.

Figure 2:
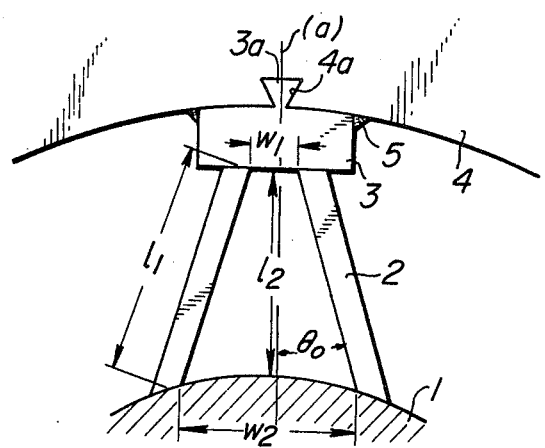
FIG. 2 is a partial cross sectional view showing one embodiment of a rotor of the present invention for use with rotary electric machinery.

Referring to FIG. 2, a rotor for use with a rotary electric machinery according to the present invention includes a rotary shaft 1, sets of arms 2 extending from the rotary shaft 1, bolsters 3 secured to the outer ends of each set of the arms 2, and a rotary core 4 having a plurality of silicon steel plates laminated in a predetermined thickness in the axial direction of the rotor and supported by the bolsters 3. The length $l_1$ of each arm 2 is greater than a distance $l_2$ between the bolster 3 and the outer circumferential surface of the rotary shaft 1 along the radial direction of the rotary shaft 1. A distance $w1$ between one ends of the two arms 2 on the side of the rotor core 4 is greater than a spacing $w_2$ between the other ends of the arms 2 on the side of the rotary shaft 1. In this manner, each set of the arms 2 are mounted between the rotor core 4 and the rotary shaft 1 to be inclined at an angle of $\theta_o$ to the radial direction (a) extending through the axis of the rotary shaft 1 and the center line of the bolster 3. As well as in the rotor as shown in FIG. 1, the arms 2 are connected at one ends to the bolster 3 and at the other ends to the rotary shaft (1).

With the arrangement as shown in FIG. 2, lengthwise rigidity of each arm 2 is reduced to be accompanied with the reduction of a lengthwise internal force in the arm 2, which is apparent from the results of calculation to be described hereinafter. Therefore, tensile stresses developed in the weld zones 5 can be reduced when the entire rotor is thermally expanded. Thus, tensile stresses developed in the weld zones 5 can be reduced without the need of subjecting the weld zones 5 to annealing, thus eliminating the aforesaid problem in strength. Meant by the term "length of an arm" as used herein is a length of an arm in cross section transverse to the axial direction of the rotary shaft 1.

The length $l_1$ of the arm 2 is greater than a distance $l_2$ between the bolster 3 and the outer peripheral surface of the rotary shaft 1, so that lengthwise internal stresses in the arms 2 as well as stresses in the weld zones 5 may be lowered, as proved by the results of the following calculation.

In the calculation in connection with the rotors of the present invention and the prior art, factors P, H, and S are defined in the following manner.

Figure 3:
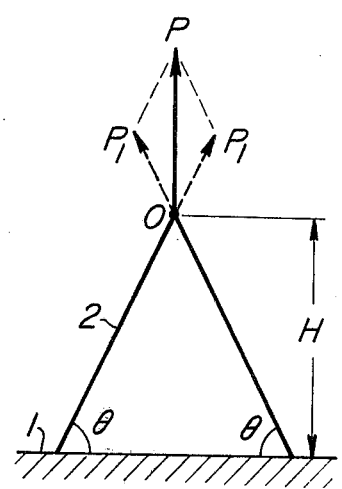
FIG. 3 is a vector diagram illustrative of internal forces developed in a set of arms, proving to demonstrate the effects of the present invention.
Figure 4:
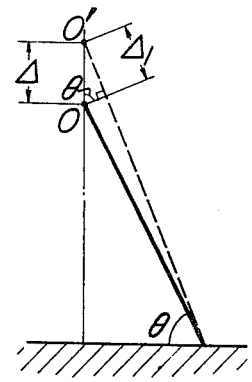
FIG. 4 is a diagram showing displacement of the arm.

P: an internal force developed between the arm 2 and the rotor core 4 secured thereto (per one bolster 3)
H: a length of the arm 2 in the radial direction of the rotary shaft
S: a cross sectional area of one arm FIGS. 3 and 4 are diagrammatic view illustrating the distribution of internal forces for better understanding of the effects of the present invention, based on the results of the calculation.

Referring to FIG. 3, a component P1 of a force P along the length of each arm 2 is given as follows:

$$P_1 = \frac{P}{2 \sin \theta} \quad (1)$$

wherein $\theta$ represents an inclined angle of the arm 2 to the line connecting joints of the arms 2 to the rotary shaft 1 together.

Referring to FIG. 4, an elongation $\Delta_1$ of the arm 2 in the direction of the component force $P_1$, when the tip of the arm 2 is elongated from a point O to a point O', is given as follows:

$$\Delta_1 = \frac{P_1}{S} \cdot \frac{\frac{H}{\sin \theta}}{E} \quad (2)$$

wherein E is Young's modulas of an arm.

A radial elongation $\Delta$ of an arm resulting from the elongation $\Delta_1$ is given:

$$\Delta = \frac{\Delta_1}{\sin \theta} \quad (3)$$

From the equations (1) to (3), $$\Delta = \frac{PH}{2SE \sin^3 \theta} \quad (4)$$

From the equation (4), a spring constant $k$ of the arm is given as follows:

$$K = \frac{P}{\Delta} = \frac{2SE \sin^3 \theta}{H} \quad (5)$$

Next, elongations of arms and spring constants thereof will be calculated with reference to the construction of a prior art rotor as shown in FIG. 1;

An elongation $\Delta'$ of an arm 2 in the radial direction due to a force P is given as follows:

$$\Delta' = \frac{PH}{2SE} \quad (6)$$

From the equation (6), a spring constant of the arm 2 is determined as follows:

$$K' = \frac{P}{\Delta'} = \frac{2SE}{H} \quad (7)$$

From the equations (5) and (7), a rigidity ratio $\beta$ of the construction of a rotor of the present invention to that of the prior art with respect to the radial elongations thereof is given as follows:

$$\beta = \frac{K}{K'} = \frac{\frac{2SE \sin^3 \theta}{H}}{\frac{2SE}{H}} = \sin^3 \theta \quad (8)$$

The ratio $\beta$ which may be obtained from the equation (8) also represents a ratio of internal stress produced between the arm 2 and the rotor core 4 secured thereto in both constructions of the rotors according to the present invention and the prior art. As a result, in the case of the same amount of welding deposits, the aforesaid ratio $\beta$ also represents a ratio of stress produced in the weld joints 5 coupling the arm 2 and the rotor core 4 together.

With the construction of a rotor according to the invention, as shown in FIG. 2, an inclined angle $\theta$ of the arm 2 is subjected to limitations arising from the length of arm 2 and the number of mounts 3 used, and designed to a range of $\theta = 60°$ to $70°$. The ratio $\beta$ may be obtained from the equation (8) in this range:

$$\beta = (\sin 60°)^3 \sim (\sin 70°)^2 = 0.65 \sim 0.83 \qquad (9)$$

In contrast thereto, with the construction of a prior art rotor as shown in FIG. 1, $\theta = 90°$, and then the ratio $\beta$ may be calculated from the equation (8) as follows:

$$\beta = (\sin 90°)^3 = 1.00 \qquad (10)$$

As is apparent from a comprison of a value $\beta$ obtained from the equation (9) with a value $\beta$ obtained from the equation (10) the construction of a rotor of the invention may reduce internal stresses produced between the arm 2 and the rotor core 4 as well as stresses produced in the weld zones 5 coupling the arm 2 to the rotor core 4 together, to 65 to 83% of those obtained from the construction of a prior art rotor, while the amount of welding deposits are assumed to be the same for the both cases.

Figure 5:
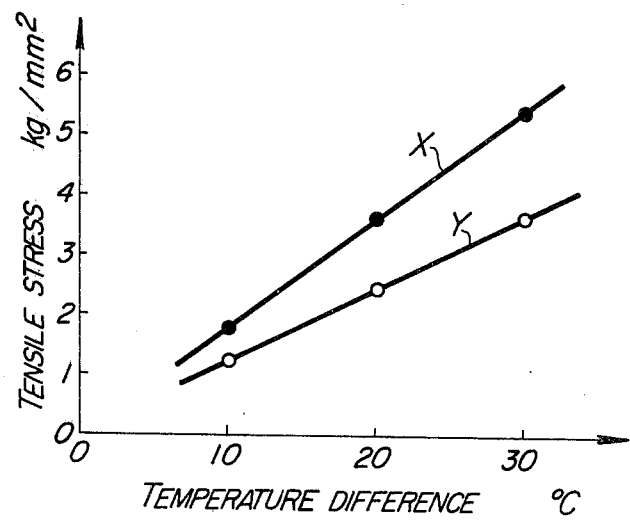
FIG. 5 is a graph in which tensile stress developed in weld zones are plotted to (temperature differences between a rotary shaft and a rotor core) according to the result of tests given by the inventors.

The results of the calculation given above well support the advantages of the present invention. Furthermore, these advantages of the invention will be described in more detail by referring to the results of tests given by the inventor. FIG. 5 shows the results of tests. Designated by X is a construction of a rotor according to the present invention, and Y a construction of a prior art rotor. In this figure, temperature differences between the rotary shaft 1 and the rotor core 4 are plotted against tensile stresses produced in the weld zones 5 between the rotor core 4 and the bolsters 3. The temperature differences between the rotary shaft 1 and the rotor core 4 are represented by an abscissa, while the tensile stresses acting on the weld joints 5 are represented by an ordinate.

As can be seen from FIG. 5, a relatively small temperature difference makes no marked difference in tensile stress between the construction X of the prior art rotor and the construction Y of a rotor according to the invention. However, as a temperature difference is increased, the difference in tensile stress produced in the weld zones in the both cases will be increased. For instance, in the case of a temperature difference of 30° C., a tensile stress in the construction Y according to the invention is reduced to about two thirds of that of the prior art rotor. It can be seen that the tensile stresses acting on the weld zones 5 may be reduced according to the present invention. In addition, a temperature difference between the rotor core 4 and the rotary shaft 1 is increased, with an increase in capacity of a rotary electric machine, and hence the rotor according to the present invention is well adapted for use in a large capacity rotary electric machine.

As is apparent from the foregoing description of the embodiment shown in FIG. 2, tensile stresses produced in the weld zones 5 may be reduced. With the rotor of the aforesaid arrangement, a spacing $w_1$ between the ends of two arms 2 on the side of the rotor core 4 is greater than a spacing $w_2$ thereof on the side of the rotary shaft 1, so that an increased working space may be achieved, facilitating welding operations for welding the arms 2 to the mounts 3, as well as the arms 2 to the rotary shaft 1.

Figure 6:
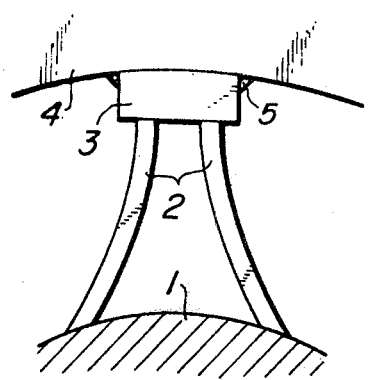
FIGS. 6 to 9 are cross sectional views of rotors of other embodiments of the present invention.
Figure 7:
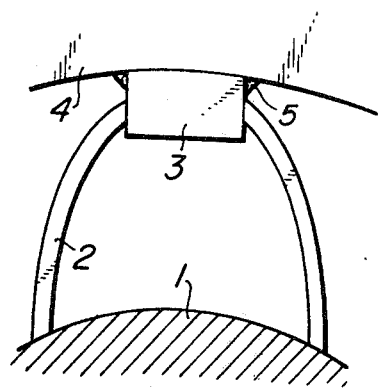
Figure 8:
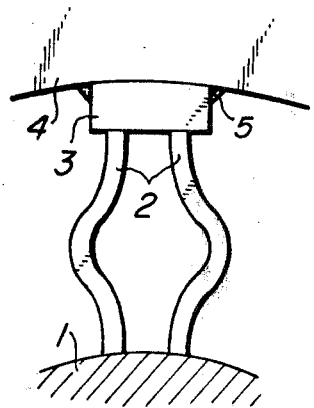
Figure 9:
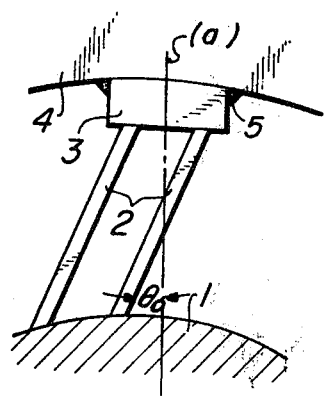

FIGS. 6 to 9 show yet further embodiments of the invention. FIGS. 6 and 7 refer to two arms which are curved inwardly and outwardly, respectively. The arms 2 shown in FIG. 6 are curved inwardly, thus providing concave curvatures. The arms 2 shown in FIG. 7 are curved outwardly, thus providing convex curvatures. The length of the arm 2 are longer than a distance between the bolster 3 and the outer peripheral surface of the rotary shaft 1, as measured in the radial direction of the rotor, thus reducing a tensile stress produced in the weld zones 5 as well as an internal stress acting in the lengthwise direction of the arms. In addition, a spacing between the ends of arms 2 on the side of the rotary shaft 1 is increased, as compared with a spacing between the ends of arms 2 on the side of the rotor core 4, thereby increasing a working space for welding operation, with the resulting ease of operation. FIG. 8 refers to arms 2 whose central portions are curved, while FIG. 9 refers to arms which are inclined at an angle of $\theta_o$ to the radial direction ($a$) but in parallel with each other. According to this arrangement as well, the length of the arms 2 themselves may be greater than a distance between the bolster 3 and the outer peripheral surface of the rotary shaft 1 in the radial direction, reducing stresses produced in the weld zones 5.

As is apparent from the foregoing description of the rotor for use in rotary electric machinery according to the present invention, the lengths of a plurality of pairs of arms extend radially from the rotary shaft, with the arms welded to the rotor core, and in addition the lengths of arms in the lengthwise direction thereof are greater than a distance between the bolster and the outer peripheral surface of the rotary shaft, as measured in the radially direction, with the resulting reduction in rigidity of arms, as well as internal stresses therein in the lengthwise direction. In addition, the tensile stresses produced in weld joints or weld zones may be also reduced, thus dispensing with an annealing treatment, with the freedom of a strength problem.

What is claimed is:

1. A rotor for use with rotary electric machinery, comprising:
    a rotary shaft;
    a plurality of sets of arms extending from said rotary shaft, said each set consisting of at least two arms;
    a rotor core having a plurality of silicon steel plates laminated in a predetermined thickness around the arms and welded to the outer ends of said arms;
    said each arm having a greater length in section transverse to the axis of the rotary shaft than a minimum length in the radial direction of the rotary shaft; and
    at least a portion of each arm extending in a non-parallel direction with a radial line extending from the rotary shaft along the minimum length.

2. A rotor as set forth in claim 1, wherein a spacing between the ends of each set of arms on the side of said rotor core is smaller than a spacing between the ends of said each set of arms on the side of said rotary shaft.

3. A rotor as set forth in claim 1, wherein said each arm is curved in section transverse to the axis of the rotary shaft.

4. A rotor as set forth in claim 2, wherein said each set of arms are curved convexly or concavely toward each other in section transverse to the axis of the rotary shaft.

5. A rotor as set forth in claim 1, wherein said each set of arms are straight, respectively and are arranged in parallel relation to each other.

6. A rotor for use with rotary electric machinery comprising:
   a rotary shaft;
   a plurality of sets of arms extending from said rotary shaft, said each set consisting of at least two arms;
   a plurality of bolsters each connected to the outer ends of said each set of arms by welding; and
   a rotor core having a plurality of silicon steel plates laminated in a predetermined thickness around the bolsters and connected to the bolsters by welding;
   said each arm having a greater length in section transverse to the axis of the rotary shaft than a minimum length in the radial direction of the rotary shaft; and
   at least a portion of each arm extending in a non-parallel direction with a radial line extending from the rotary shaft along the minimum length.

7. A rotor as set forth in claim 6, wherein a spacing between the ends of each set of arms on the side of said bolster is smaller than a spacing between the ends of said each set of arms on the side of said rotary shaft.

8. A rotor as set forth in claim 6, wherein said each arm is curved in section transverse to the axis of the rotary shaft.

9. A rotor as set forth in claim 7, wherein said each set of arms are curved convexly or concavely toward each other in section transverse to the axis of the rotary shaft.

10. A rotor as set forth in claim 6, wherein said each set of arms are straight, respecitvely, and are arranged in parallel relation to each other.

11. A rotor for use with rotary electric machinery comprising:
    a rotary shaft;
    a plurality of arm means extending outwardly from said rotary shaft, each of said arm means including at least two arm members;
    a rotor core having a plurality of plates laminated in a predetermined thickness around said arm means, said rotor core being welded to said arm means so as to form welded zones therebetween; and
    said arm means having said arm members thereof configured for reducing tensile stresses developed in the welded zones of said rotor core and said arm means.

12. A rotor as set forth in claim 11, wherein each arm member is configured with a greater length in section transverse to the axis of said rotary shaft than a minimum length in the radial direction of said rotary shaft between said rotary shaft and said rotor core, at least a portion of each arm member extending in a non-parallel direction with a radial line extending from the rotary shaft along the minimum length.

13. A rotor as set forth in claim 11, wherein each of said arm means includes a bolster having the outer ends of said at least two arm members connected thereto, said rotor core being welded to said bolster of said arm means.

14. A rotor as set forth in claim 13, wherein said rotor core and said bolster are further connected to one another by dovetail joints.

15. A rotor as set forth in claim 11, wherein a spacing between the ends of said at least two arm members of said arm means on the side of said rotor core is smaller than a spacing between the ends of said at least two arm members of said arm means on the side of said rotary shaft.

16. A rotor as set forth in claim 11, wherein each of said arm members is curved in section transverse to the axis of said rotary shaft.

17. A rotor as set forth in claim 11, wherein said at least two arm members of said arm means are curved convexly or concavely toward one another in section transverse to the axis of said rotary shaft.

18. A rotor as set forth in claim 11, wherein said at least two arm members of said arm means are straight, respectively, and are arranged in parallel relation to one another.

19. A rotor core according to claim 11, wherein said core includes silicon steel plates, and the configuration of said arm members reduces tensile stresses in the weld zones even when said rotor core is subjected to thermal expansion thereby eliminating the need for annealing of the weld zones.

* * * * *